No. 684,211. Patented Oct. 8, 1901.
W. F. FERCH.
FISH HOOK.
(Application filed June 24, 1901.)
(No Model.)
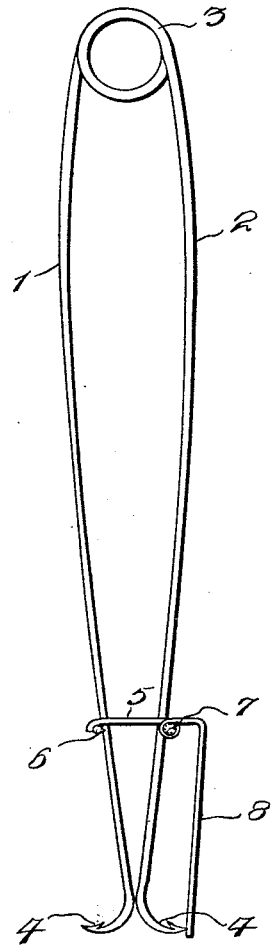
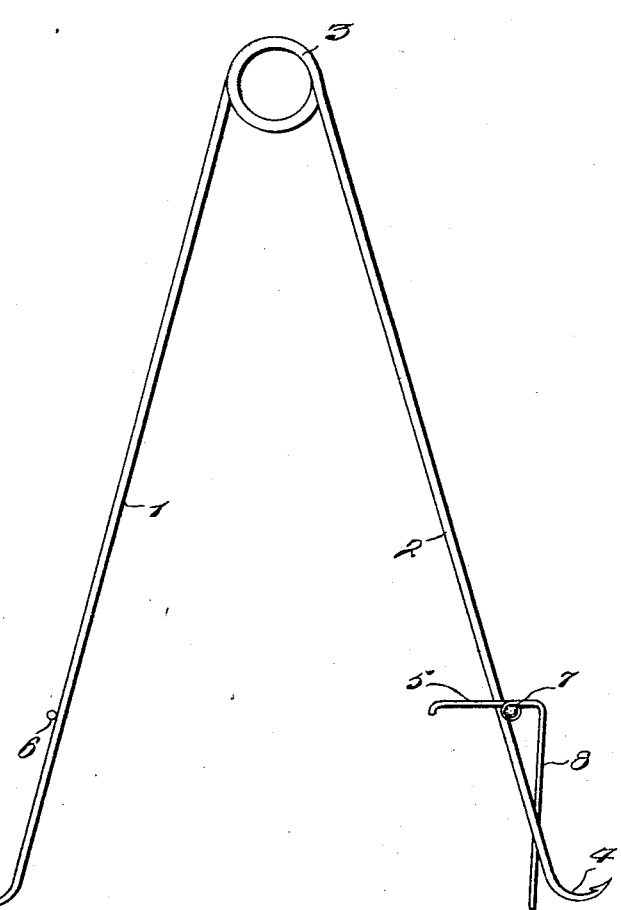
Witnesses
O. M. Simpson
H. J. Shepard
William F. Ferch, Inventor
by C. A. Snow & Co.
Attorneys

UNITED STATES PATENT OFFICE.

WILLIAM F. FERCH, OF LOS ANGELES, CALIFORNIA.

FISH-HOOK.

SPECIFICATION forming part of Letters Patent No. 684,211, dated October 8, 1901.

Application filed June 24, 1901. Serial No. 65,857. (No model.)

*To all whom it may concern:*

Be it known that I, WILLIAM F. FERCH, a citizen of the United States, residing at Los Angeles, in the county of Los Angeles and State of California, have invented a new and useful Fish-Hook, of which the following is a specification.

This invention relates to fish-hooks, and has for its object to provide an improved device of this character wherein a plurality of hooks are normally held in close proximity and under tension and also arranged to be released by the attempt of a fish to obtain the bait, thereby to permit of the hooks being sprung apart and engaged with opposite portions of the fish's mouth. It is furthermore designed to facilitate the assembling or setting of the several hooks and to insure the prompt release of the means for holding the hooks together.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of the improved hook when set to catch a fish. Fig. 2 is a similar view showing the hooks released and separated or sprung apart.

Like characters of reference designate corresponding parts in both figures of the drawings.

In carrying out the present invention there is provided a single length of stiff spring wire or rod, which is bent intermediate of its ends into substantially V form, thereby providing the opposite shanks 1 and 2, the bend of the wire being coiled into a spring-loop 3. The free extremity of each shank is formed into an ordinary barbed hook 4, the two hooks being reversely arranged, so that their points project outwardly in opposite directions and in the plane of the two shanks. The spring-loop forms a convenient eye for the connection of the line.

Pivotally mounted upon one of the shanks—as, for instance, the shank 2—is a catch 5, which has its free end formed into a hook for engagement with a keeper or projection 6, carried by the opposite shank, whereby the two shanks may be held in close proximity, and thereby under tension caused by the spring-loop 3. This catch is pivoted intermediate of its ends, as at 7, and to the outer free end thereof there is connected a pendent trip device 8, which overlaps the hook of the adjacent shank, so that when a fish takes the bait in his mouth his teeth or jaw presses against the trip device, thereby disengaging the catch, whereupon the shanks are released and spring apart under the influence of the spring-loop, thereby separating the hooks and engaging the same with opposite portions of the fish's mouth.

What is claimed is—

1. A fish-hook, comprising a pair of hook members, which are under a separating spring tension, a keeper upon one of the members, a catch pivoted intermediate of its ends upon the other member and having its inner free end constructed for engagement with the keeper to hold the members together, and a trip device connected to the outer end of the catch and having its free end passed transversely across the adjacent hook and in position to be engaged by the fish.

2. A fish-hook, formed from a single length of spring metal bent intermediate of its ends into substantially V shape, there being a spring-coil formed at the intersection of the opposite shank members, and the outer free end of each member being formed into a barbed hook, a projection provided upon one shank member adjacent to the hook, a catch pivoted intermediate of its ends upon the other member, and having its inner end hooked to engage the projection, and a trip device carried by the outer free end of the catch, with its free end portion extended across the adjacent hook and in position to be engaged by the fish.

3. The fish-hook, formed from a single length of spring metal bent to form members 1 and 2 and each of said members at its outer free end being formed into a barbed hook 4, a projection 6 provided upon one of the members at a point adjacent to the hook, a catch pivoted intermediate of its length upon the opposite member and having a hooked arm 5 for engagement with said projection and a depending arm 8 extending to or below the level of the hook and adapted to be engaged by the fish.

In testimony that I claim the foregoing as my own I have hereto affixed my signature in the presence of two witnesses.

WILLIAM F. FERCH.

Witnesses:
A. C. WALKER,
A. J. JULIUS.